3,088,926
TRIAMERIC SYNTHETIC RESIN COMPOSITIONS AND METHOD OF MAKING THE SAME
Jack P. Morris, Detroit, and Charles J. Meeske, Birmingham, Mich., assignors to Reichhold Chemicals, Inc., White Plains, N.Y.
No Drawing. Filed Mar. 7, 1960, Ser. No. 12,974
15 Claims. (Cl. 260—21)

This invention relates to improved resin compositions and, more particularly, to triameric synthetic resin compositions containing distinct types of thermosetting resins.

The surface-coating industry has long recognized that the ultimate properties of surface-coating compositions include durability, chemical resistance, and color and gloss retention. Also, ease of application, as well as high adherency, are equally important. Appliance and automotive manufacturers, for example, are keenly aware of the foregoing properties and have constantly endeavored to achieve these goals by substantial expenditures for research and development. Of course, these efforts have extended to paint manufacturers, as well as suppliers thereto, such as resin manufacturers.

Although natural resins possess some desirable properties for surface-coating compositions, it has been known that synthetic resins possess vastly superior properties. While surface-coating compositions heretofore contained the natural resins, more modern formulations are substantially void of these resins and depend entirely on synthetic resins to form the protective or decorative film or coating.

Alkyd resins were a step forward over varnishes when used as surface-coating components for the appliance and automotive industry, but it was found desirable to modify the alkyd resins with urea or melamine resins. Although these modified resins resulted in surface-coating compositions having good color retention, durability, and toughness, it was soon found that such compositions had relatively poor chemical and water resistance. Also, acrylic lacquers or solutions of polymers thereof were found to have inferior adherency and were extremely difficult to apply because of their necessarily low-solids content. Because of this low-solids content, a substantial number of sprayed coatings are required, which, of course, make the application of such material extremely costly. These acrylics also possess poor solvent resistance, as well as heat resistance. The acrylic lacquers, however, do possess high gloss retention, but, because of the aforesaid properties, they have not been found completely satisfactory as surface-coating materials for appliance or automotive finishes.

Another resin, which has found some application in the appliance and automotive fields, is the epoxy resin. This particular resin has been found to have limited application and is presently restricted to use as a primer, because compositions of this resin have extremely poor gloss retention, that is, they tend to chalk in a relatively short time.

It is an object of the present invention to provide a resin for surface-coating compositions having high chemical resistance.

It is a further object of the invention to provide a resin for surface-coating compositions having high gloss retention.

A further object of the invention is to provide a resin for surface-coating compositions having high color retention.

Other objects include providing a resin for surface-coating compositions having high thermal and solvent resistance, as well as having highly desirable adhesive characteristics, which may be easily and readily applied.

These and other objects will be evident from the following specification and claims appended thereto.

It has been discovered that these and other objects are obtained with a triamer resinous material comprising a non-drying type alkyd, vinyl benzene and an acrylic compound such as acrylic and methacrylic acids and esters or mixtures thereof. Methacrylic acid esters are preferred and will be referred to hereinafter in this specification as the third compound of the composition.

Generally, it is preferred to form the triamer with about 40 to about 80 percent by weight of the alkyd, but about 50 to about 70 weight percent has been found more satisfactory, with especially desirable products being obtained when the weight percent of the alkyd is in the range of about 50 to about 60. The vinyl benzene should be present in the triamer in weight percent amounts of about 10 to about 40, but generally 15 to 35 has been found to be more satisfactory and 20 to about 25 has been found to give particularly desirable resins. The methacrylic acid esters should be present in the triamer in weight percent amounts of about 10 to about 40, but generally 15 to 35 has been found to be more satisfactory, and 25 to about 30 has been found to give particularly desirable resins.

The triamer, although suitable for many uses, is particularly suitable for surface-coating compositions, such as baked finishes, and the like. In the surface-coating compositions, this triamer is formulated with the usual hydrocarbon solvents, i.e., aromatic naphthas, etc., pigments, stabilizing agents, etc., and is properly mixed to form a composition wherein the film produced therefrom is normally baked (heat-convertible) at elevated temperatures generally in the range of about 250° F. to about 400° F. for 4 minutes to about 5 minutes to effect curing thereof.

It is presently believed that the triamer is chemically a polymerization product, wherein at least a portion of the non-drying alkyd is chemically joined through the unsaturated dibasic or monobasic component of the alkyd to the reaction product of the vinyl benzene, methacrylic acid ester copolymer. However, because of the complexity of resin formation, it is believed that some of the triamer may contain only the vinyl benzene and alkyd and others may contain only the methacrylic acid esters and the alkyd. It is believed, however, that predominantly the triamer contains the aforesaid three components. This explanation of the triamer is presented merely to describe the present understanding thereof and is not in any way intended to be limited thereto.

The non-drying alkyds are particularly critical as to their chemical identity, in order for them to be combined with the methacrylic acid esters and the vinyl benzene. In general, the alkyd is prepared from a combination of a major portion of saturated dicarboxylic acids and a minor portion of unsaturated acids. The term "saturated," as used herein and in the appended claims, is intended to include straight-chain saturated acids, as well as the aromatic type acids, wherein the aromatic radical for the purpose of the description of this present invention is considered to be saturated. For example, particularly suitable saturated dicarboxylic acids are the phthalic acids, which include the ortho and meta isomers, as well as mixtures thereof, anhydrides of these isomers which will form anhydrides, and a partial substitution of para phthalic, adipic acid, or other color-stable dibasic acids is possible. Suitable unsaturated acids include maleic, fumaric, itaconic, sorbic, methacrylic, acrylic, etc., which are mono or dibasic acids containing double bonds, i.e., carbon to carbon unsaturation.

These acids are reacted with polyhydric alcohols, such as glycerine, trimethylol propane, trimethylol ethane, or mixtures thereof, pentaerythritol combined with a glycol, or any of these combined with a glycol. The glycols may be ethylene, propylene, 1,3 butylene, diethylene, etc., in origin. It is generally preferred that the glycol be of the type of ethylene or propylene origin, because of their outstanding color stability and because color-stable polyhydric alcohols are preferred.

The fatty acid used is of the saturated monobasic acid type, such as coconut fatty acids (or oil), fractions of distillation products from coconut fatty acids, or synthetic acids, such as pelargonic acid, 2 ethylhexoic acid, etc. It has been found to be desirable to utilize short chain fatty acids having about 8 to about 14 carbon atoms, because this type of short chain acid has much greater compatibility with other components of the final resin composition. Further, it is well recognized that alkyds formed from saturated fatty acids are commonly called "non-drying" alkyds.

The alkyd or alkyd intermediate, as it is also sometimes called for the purpose of this present invention, may be prepared in any suitable customary manner known to the art. The physical constants desired for this non-drying alkyd are a Gardner-Holdt viscosity of E–F at 60 percent non-volatile content in xylene, which is equivalent at 70 percent nonvolatile content in xylene to a viscosity of T–V on this same scale. The acid number of this intermediate should be in the range of about 5–20 at 70 percent non-volatile and preferably in a range of about 10 to about 13. The color of this product should be as light as possible and should range from about 1 to about 6 (Gardner 1933 standards) at 70 percent non-volatile. Generally, the amount of the saturated dicarboxylic acid in the reaction mixture should be from about 30 to about 45 percent depending upon which particular acid or anyhdride is used, the carbon chain length of the fatty acid used, and the equivalent weight of the polyol. The unsaturated acid should be present in the reaction mixture in a percentage generally in the range of from about 1 to about 3 of the total resin solids and may be as high as 6, if sufficient dihydric alcohol (glycol) is used. The fatty acid should be present in the reaction mixture in the range of about 40 percent to about 50 percent depending upon the chain length; the shorter the chain length the smaller the amount that will be required. The polyhydric alcohol should be present in a stoichiometric excess required to esterify the carboxylic acid groups and usually this excess should range from about 10 percent to about 20 percent.

The following are illustrative procedures and compositions for preparing this intermediate non-drying alkyd polymer and are not intended to be limiting thereto:

*Example I*

The following ingredients were charged to a three-necked glass flask equipped with an agitator, thermometer, inert gas inlet and vapor outlet:

| | Parts |
|---|---|
| Coconut fatty acids | 116 |
| Glycerine | 78 |
| Phthalic anhydride | 100 |
| Maleic anhydride | 5 |

With the agitator on and inert gas bubbling through a submerged sparge, the temperature was raised to 185° C. and held for two hours. Then, the temperature was raised to 195° C. and held for a viscosity of H–I (Gardner-Holdt) of a 60 percent non-volatile solution in xylol. After eleven hours at 195° C., the viscosity reached G–H and had an acid number of 20.8 at 60 percent non-volatile in xylol.

*Example II*

To the equipment described in Example I, the following ingredients were charged:

| | Parts |
|---|---|
| Coconut fatty acids | 120 |
| Pentaerythritol | 49 |

These ingredients were heated to 195° C. with the agitator on and inert gas bubbling through the submerged sparge and reacted for one hour.

Thereafter, the following ingredients were added:

| | Parts |
|---|---|
| Ethylene glycol | 26 |
| Phthalic anhydride | 100 |
| Maleic anhydride | 4 |

This mixture was then heated to 185° C. and held at that temperature for three hours. Thereafter, the temperature was raised to 210° C. and held until an acid number of 6–12 was reached at a 60 percent non-volatile solution in xylol. This took seven hours. Thereafter, the batch was thinned in xylol to 70 percent non-volatile and had a Gardner-Holdt viscosity of U–V and an acid number of 11.9.

The methacrylate esters particularly suitable for the resin of this invention include methyl, ethyl and butyl methacrylates, i.e., $C_1$—$C_4$ or one to four carbon atoms, with the higher esters producing more flexible resins, and, thus, selection of the most desirable ester or combinations of esters depends on the ultimate use of the resin. The acrylate esters of the $C_1$—$C_4$ alcohols can also be used to a more limited extent, but, because they produce much softer films and the odor of any residual monomer is very objectionable, they are not preferred. If desired, a small amount of an unsaturated monocarboxylic acid, such as methacrylic acid or acrylic acid, or a dicarboxylic acid, such as maleic or its isomers, may be copolymerized to provide additional carboxyl groups in the polymer, which will be available to react with other resins and which may be added to the resin of this invention for the purpose of primarily accelerating cure when the films are baked. The amount of unsaturated acid is limited, it has been found, to the acid number of the final triamer, and this should generally not exceed 30 on a non-volatile resin basis and, preferably, is between about 15 and about 25.

As used herein, the term "vinyl benzene" is intended to include styrene, vinyl toluene, or mixtures thereof.

The following examples of forming the triamer resin product are presented for illustrative purposes and are not intended to be limiting thereto:

*Example III*

To a glass three-liter, three-necked flask equipped with an agitator, a reflux condenser, a thermometer, and an inert gas tube was charged:

| | Parts |
|---|---|
| Example I product | 800 |
| Xylol | 320 |

With the agitator on and inert gas being slowly passed into the flask, the temperature was raised to 130° C. and, over a two-hour period, the following mixture was added while maintaining the temperature at 130° C.:

| | Parts |
|---|---|
| Methyl methacrylate | 96 |
| Styrene | 64 |
| Ditertiary butyl peroxide (catalyst) | 5 |

Seven hours after the addition was completed, the reaction mixture was cooled down and found to have the following constants:

| | |
|---|---|
| Viscosity (Gardner-Holdt) | F–G |
| Acid number | 12.5 |
| Color | 4 |
| Non-volatile _____percent__ | 50 |

This resin contained 75 percent of the alkyd and 25 percent of a 60–40 weight percent ratio of methyl methacrylate and styrene.

Example IV

To a flask, as described in Example III, was charged:

| | Parts |
|---|---|
| Example II product | 600 |
| Xylol | 584 |

This mixture was heated to between 130° C. and 140° C. while being agitated and inert gas being slowly passed into the flask while under reflux. This temperature was maintained while the following monomers were added over a two-hour period:

| | Parts |
|---|---|
| Methyl methacrylate | 172 |
| Styrene | 172 |
| Ditertiary butyl peroxide (catalyst) | 3.5 |

After an additional 12 hours, this triamer was found to have a Gardner-Holdt viscosity of U–V at 50 percent non-volatile in xylol and a color of 4–5. This triamer was prepared in proportions of 55 percent alkyd and 45 percent of a 50–50 weight percent ratio of methyl methacrylate and styrene.

Example V

The resin of this example was prepared in the same manner as Example IV, except that, at the end of the addition of the components of the triamer, 13.76 parts of methacrylic acid is added. This is 4 weight percent of the total triamer components previously added. After seven hours at reflux, the resin solution had a Gardner-Holdt viscosity of X–Y.

Example VI

A triamer copolymer was prepared in an identical manner to Example IV, except that vinyl toluene monomer was substituted for styrene monomer. Eight hours after all additions were completed, the resin solution had a Gardner-Holdt viscosity of S–T$^2$ at 49.7 percent non-volatile and a color of 4.

Example VII

A triamer copolymer was prepared in the same manner as in Example IV using:

750 parts of Example II alkyd solution
15 parts of ethyl acrylate monomer
727 parts of xylol After heating to reflux temperature, we added the following mixture of ingredients over a 2-hour period:

| | Parts |
|---|---|
| Ethyl acrylate monomer | 7 |
| Styrene monomer | 209 |
| Methyl methacrylate | 209 |
| Ditertiary butyl peroxide | 4.35 |

The batch was held 7 hours after all additions were completed, and the following constants were obtained:

| | |
|---|---|
| Non-volatile percent | 49.8 |
| Acid number | 6.4 |
| Color | 3 |
| Viscosity (Gardner-Holdt) | T–U$^2$ |

While the foregoing exemplified resins have outstandingly superior properties, when incorporated into surface-coating compositions, it was also found that other resins may be added to this triamer to give a composition having particularly outstanding characteristics when used as a component of surface-coating materials. For example, it was found that amino-plasts impart particularly desirable qualities to the triamer. Also, certain epoxy resins may be added to the triamer in conjunction with the amino-plasts or separately without the amino-plasts.

One of the amino-plasts found to be particularly desirable is the amino-triazine compound and, more particularly, substituted melamine-aldehyde resins wherein the melamine-aldehyde resin (or melamine-formaldehyde reaction product) is further reacted with butyl alcohol. The alcohols, which are suitable as a reactant, and are short chain alcohol and include n-butanol, isobutanol and minor proportions of higher alcohols. Of these, n-butanol is preferred. An organic solvent is required for the reaction; examples include alcohols or a mixture of aromatic solvents and alcohols. Aromatic solvents include xylol, toluol, and higher boiling aromatic solvents, of which xylol is preferred. At a non-volatile content of 60 percent, the melamine resin suitable to be incorporated with the triamer should have the characteristics that 10 parts (by weight) of the resin can tolerate the addition of about 45 to 85 parts of mineral spirits with a kauri-butanol value of 38–39 before becoming cloudy. This criterion of mineral spirits tolerance is a measurement of a degree of etherification of the melamine resin with butyl alcohol. Further, as a general criterion, any melamine resin compatible with the monomer-modified alkyd, hereinabove described, is suitable if it also converts on baking to a hard film.

In addition, epoxy resins may also be incorporated with the triamer separately or in admixture with the amino-plasts. The epoxy resins suitable to be incorporated with the triamer may be of the commercially available type known as Epotuf, which consists of the reaction product of epichlorohydrin and bisphenol-A (P,P'-dihydroxy diphenyl-dimethyl methane) made under alkaline conditions. Other dihydric phenols may be substituted to react with the epichlorohydrin to produce suitable epoxy resins. Chemically, these resins are glycidyl ethers of dihydric phenols. They have an epoxide equivalent of from about 150 to about 1500 and range in viscosity from normally liquid to normally solid materials.

The following example illustrates particular facets of this invention regarding the addition to the triamer of the two resins hereinabove referred to and are not limited thereto:

Example VIII

A mixture of the product of Example IV with melamine and epoxy resin was made as follows:

To a glass beaker was added 140 parts of Example IV, 10 parts by weight of an epoxy resin characterized as having an epoxide equivalent of 185–225, a viscosity of 125–160 poises, and being 100% reactable; 6.6 parts of xylol; 10 parts of normal butanol and 33.3 parts of a melamine formaldehyde resin solution having the following characteristics. 60 percent non-volatile viscosity U–X and a mineral spirits tolerance of 640 percent.

After these components had been mixed the mixture was found to have the following constants:

| | |
|---|---|
| Viscosity (Gardner-Holdt) | M–P |
| Acid number | 8–12 |
| Color max | 6 |
| Non-vol. percent | 49–51 |

The following examples illustrate surface-coating compositions which may be prepared utilizing the triamer:

Example IX

A white enamel was made with the product of Example IV by grinding the following mixture in a pebble mill for 24 hours.

| | Parts |
|---|---|
| TiO$_2$ | 450 |
| Example IV product | 120 |
| Xylol | 100 |
| 8% zinc naphthenate | 4 |

Thereafter 100 parts of Example IV were added to the mill and the batch ground for one hour longer in the pebble mill. Then this ground mixture was added to the following:

| | Parts |
|---|---|
| Example IV product | 1120 |
| Melamine resin (described in Example VIII) | 476 |
| Xylol | 116 |
| Diacetone alcohol | 32 |
| Ethyl amyl ketone | 32 |

The composition had a pigment content on a solids basis of 32 percent and non-volatiles on solution of 55 percent.

This enamel was applied to a metal surface and found to have substantially better gloss retention than a similar enamel made from a mixture of non-drying alkyd and melamine resin in the same proportions.

*Example X*

A white enamel was made with the product of Example VIII as follows.

To a ball mill was added:

| | Parts |
|---|---|
| Titanium dioxide | 155 |
| Example VIII | 50 |
| 8% zinc naphthenate | 1.4 |
| Xylol | 34 |
| Diacetone alcohol | 10 |

This was ground to a fineness of 7–8 (Hegman gauge). Then, an additional 50 parts of the product of Example VIII was added and ground for an additional one hour. This ground mixture was then added to:

| | Parts |
|---|---|
| Example VIII | 556 |
| Xylol | 47 |
| Cellosolve acetate | 9 |
| Ethyl amyl ketone | 18 | and had the characteristics of non-volatile material of 52 percent and the pigment on non-volatile of 32 percent. The enamel was further reduced with 50 parts of xylol for every 100 parts of enamel for ease of spraying. A comparable enamel made with non-drying alkyd and melamine was found not to have as good gloss retention and chemical resistance, nor as good water resistance as the enamel product of this example.

We claim:

1. A solution in an organic solvent of a resinous material compatible with aminoplasts and heat convertible to form a surface coating having high chemical resistance, high gloss retention, high color retention and desirable adhesion characteristics, said resinous material being a copolymer of (A) a non-drying alkyd resin and (B) unsaturated monomers, the non-drying alkyd resin being an ester of (1) at least one saturated monocarboxylic acid having 8–14 carbon atoms, (2) at least one benzoid dibasic acid, (3) at least one butanedoic acid, and (4) at least one polyhydric alcohol, said ingredients (1), (2), (3) and (4) constituting the sole reacting ingredients of the alkyd resin, the unsaturated monomers being a mixture of at least one unsaturated carboxylic acid component selected from the group consisting of acrylic and methacrylic esters and mixtures thereof, at most a minor amount of an unsaturated carboxylic acid selected from the group consisting of acrylic and methacrylic acid, and at least one vinyl monomer selected from the group consisting of styrene, vinyl toluene and mixtures thereof.

2. A resinous material as set forth in claim 1 further modified with an aminoplast.

3. A resinous material as set forth in claim 1 further modified with a melamine-aldehyde resin.

4. A resinous material as set forth in claim 1 wherein the unsaturated monomers include a minor portion of the unsaturated carboxylic acid.

5. A resinous material as set forth in claim 4 further modified with an aminoplast.

6. A resinous material as set forth in claim 4 further modified with a resinous glycidyl ether of a dihydric phenol.

7. A resinous material as set forth in claim 4 further modified with an aminoplast and a resinous glycidyl ether of a dihydric phenol.

8. A method of making a resinous composition which is compatible with aminoplasts and heat convertible to form a surface coating having high chemical resistance, high gloss retention and desirable adhesion characteristics, which method comprises copolymerizing in organic solution (A) a non-drying alkyd resin and (B) unsaturated monomers, the non-drying alkyd resin being an ester of (1) at least one saturated monocarboxylic acid having 8–14 carbon atoms, (2) at least one benzoid dibasic acid, (3) at least one butanedoic acid, and (4) at least one polyhydric alcohol, said ingredients (1), (2), (3) and (4) constituting the sole reaction ingredients of the alkyd resin, the unsaturated monomers being a mixture of at least one unsaturated carboxylic acid component selected from the group consisting of acrylic and methacrylic esters and mixtures thereof, at most a minor amount of an unsaturated carboxylic acid selected from the group consisting of acrylic and methacrylic acid, and at least one vinyl monomer selected from the group consisting of styrene, vinyl toluene and mixtures thereof.

9. A method which comprises further combining the product produced by the method of claim 8 with an aminoplast.

10. A method which comprises further combining the product produced by the method of claim 8 with a melamine resin.

11. A method as set forth in claim 8 wherein the unsaturated monomers include a minor amount of a vinyl carboxylic acid.

12. A method which comprises further combining the product produced by the method of claim 11 with an aminoplast.

13. A method which comprises further combining the product produced by the method of claim 11 with a melamine resin.

14. A method which comprises further combining the product produced by the method of claim 11 with a resinous glycidyl ether of a dihydric phenol.

15. A method which comprises further combining the product produced by the method of claim 11 which a melamine resin and a resinous glycidyl ether of a dihydric phenol.

References Cited in the file of this patent

UNITED STATES PATENTS

| | | |
|---|---|---|
| 2,857,347 | De Groote et al. | Oct. 21, 1958 |
| 2,890,186 | Sample | June 9, 1959 |
| 2,895,929 | Yusem | July 21, 1959 |
| 2,919,253 | Hart | Dec. 29, 1959 |
| 2,937,153 | Rasmussen | Mar. 17, 1960 |
| 2,965,602 | Hicks | Dec. 20, 1960 |